United States Patent
Overcash et al.

(10) Patent No.: US 12,348,357 B1
(45) Date of Patent: Jul. 1, 2025

(54) FAILOVER TO CELLULAR SERVICE FOR SEAMLESS INTERNET CONNECTIVITY

(71) Applicant: Cox Communications, Inc., Atlanta, GA (US)

(72) Inventors: Michael Paul Overcash, Duluth, GA (US); Yousef Wasef Nijim, Cumming, GA (US); Anthony Joseph Insinga, Powder Springs, GA (US); James Alan Strothmann, Johns Creek, GA (US); Matthew Wayne Chapell, Lawrenceville, GA (US)

(73) Assignee: Cox Communications, Inc.

( * ) Notice: Subject to any disclaimer, the term of this patent is extended or adjusted under 35 U.S.C. 154(b) by 610 days.

(21) Appl. No.: 17/712,470

(22) Filed: Apr. 4, 2022

Related U.S. Application Data

(60) Provisional application No. 63/259,908, filed on Jul. 2, 2021.

(51) Int. Cl.
| | |
|---|---|
| H04L 1/00 | (2006.01) |
| H04L 41/0663 | (2022.01) |
| H04L 41/16 | (2022.01) |
| H04W 24/04 | (2009.01) |
| H04W 36/00 | (2009.01) |
| H04W 36/30 | (2009.01) |
| H04W 88/16 | (2009.01) |

(52) U.S. Cl.
CPC ......... *H04L 41/0663* (2013.01); *H04L 41/16* (2013.01); *H04W 24/04* (2013.01); *H04W 36/0022* (2013.01); *H04W 36/302* (2023.05); *H04W 88/16* (2013.01)

(58) Field of Classification Search
CPC .... H04L 41/0663; H04L 41/16; H04W 24/04; H04W 36/0022; H04W 36/302; H04W 88/16
See application file for complete search history.

(56) References Cited

U.S. PATENT DOCUMENTS

| | | | | |
|---|---|---|---|---|
| 2008/0313327 | A1* | 12/2008 | Sewall | H04L 12/287 709/224 |
| 2009/0274287 | A1* | 11/2009 | Al-Duwaish | H04W 4/16 379/207.03 |
| 2015/0281955 | A1* | 10/2015 | Zhang | H04W 4/021 726/4 |
| 2018/0132174 | A1* | 5/2018 | Strong | H04L 45/00 |

(Continued)

*Primary Examiner* — Edan Orgad
*Assistant Examiner* — Hidayat Dabiri
(74) *Attorney, Agent, or Firm* — Merchant & Gould P.C.

(57) ABSTRACT

Aspects of the present disclosure provide a failover service in part by utilizing a smartphone when a business or home modem is inoperable or otherwise unable to provide adequate internet service. Once the smartphone is paired with a communication bridge, the smartphone may be used to provide internet services to wired and wireless devices associated with a first network. The smartphone can utilize its cellular network interface to connect to the internet and provide internet connectivity via the communication bridge to a router or gateway which, in turn, enables devices connected to the router or gateway to access the internet without having to connect directly to a separate network provided by the smartphone. Aspects of the disclosure may rely on machine learning to optimize network and/or device communications, configurations, and/or other failover parameters.

19 Claims, 10 Drawing Sheets

(56) References Cited

U.S. PATENT DOCUMENTS

| | | | |
|---|---|---|---|
| 2020/0213400 A1* | 7/2020 | Van Oort | H04L 43/0817 |
| 2020/0214056 A1* | 7/2020 | Comerica | G06F 21/81 |
| 2021/0029019 A1* | 1/2021 | Kottapalli | H04L 41/5025 |
| 2021/0136869 A1* | 5/2021 | Radmand | H04W 84/18 |

* cited by examiner

FAILOVER TO CELLULAR SERVICE FOR SEAMLESS INTERNET CONNECTIVITY

CROSS-REFERENCE TO RELATED APPLICATION

This application claims the benefit of U.S. Provisional Application No. 63/259,908 filed Jul. 2, 2021 which is incorporated herein by reference in its entirety.

BACKGROUND

Both businesses and homes have an increasingly large number of devices on premise capable of internet connectivity. Often, internet service providers (ISPs) supply customers with one or more pieces of customer premise equipment (CPE) for providing internet services, such as a modem and a router or a gateway having functionalities of both a modem and a router in a single device. One or more of devices may be connected to the router or the gateway forming a first network associated with a first service set identifier (SSID) over which the devices may establish internet connectivity.

If the services provided by the ISP fail for one of a variety of reasons, customers may alternatively utilize a cellular device connected to a cellular network as a hotspot that forms a second network with the devices to enable the devices to regain internet connectivity via the cellular network. However, after a customer has activated the hotspot via device settings to the cellular device, the customer must then configure each device individually (e.g., configure device-by-device) to connect to the second network, which is associated with a second SSID. For example, the customer must go into network settings of each device, select the second network to connect to, and often enter a password for the second network. This can be quite time consuming, error prone, and frustrating for the user, especially given the large number of devices that may be located on premise.

A cellular device may be unable to accommodate and provide internet connectivity to all of the devices previously supported by a gateway due in part to the smaller form factor and limited Wi-Fi connection points. Additionally, the strength of signals provided via the hotspot of the cellular device may be weaker than the strength of signals provided by dedicated access points, such as routers or gateways. As a result, the cellular device must often be placed within a particular distance from connected devices (e.g., within a same room) or other similar device to enable mesh networks to be utilized.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure provide for systems, methods, and computer readable media for providing a failover mechanism in part by relying on a cellular network interface of a smartphone to access a cellular network. In one aspect, a system provides a failover service in part by utilizing a smartphone when a business or home modem is inoperable or otherwise unable to provide adequate internet service. Once the smartphone is paired with a communication bridge, the smartphone may be used to provide internet services to wired and wireless devices associated with a first network. One pairing mechanism includes using a wireless pairing operation to pair a smartphone with a communication bridge to form a communication path between the smartphone and a router or gateway that will be used to provide internet access to devices of the first network. The smartphone can utilize its cellular network interface to connect to the internet and provide internet connectivity via the communication bridge to the router or gateway which, in turn, enables devices connected to the router or gateway to access the internet without having to connect directly to the smartphone. The system may rely on machine learning to optimize network and/or device communications, configurations, and/or other failover parameters.

In another aspect, a method provides a failover service using a smartphone as a failover device when a modem or gateway is inoperable or otherwise insufficient to provide adequate internet service. The method includes pairing the smartphone with a communication bridge to enable wireless communication between the smartphone and the communication bridge, wherein the communication bridge is connected to a router or gateway via Ethernet cabling. Once the failover mode is activated, the method uses smartphone to: communicate with a cellular network, translate cellular signals into non-cellular signals, and wirelessly provide the non-cellular signals to the paired communication bridge. The method then uses the communication bridge to provide the non-cellular signals to the router or gateway. The method uses the router or gateway to provide internet access to one or more connected devices of a first network via the smartphone's communications with the cellular network. The method may rely on machine learning to optimize network and/or device communications, configurations, and/or other failover parameters.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Aspects of the present disclosure provide a failover service in part by utilizing a smartphone when a business or home modem is inoperable or otherwise unable to provide adequate internet service. Once the smartphone is paired with a communication bridge, the smartphone may be used to provide internet services to wired and wireless devices associated with a first network. One pairing mechanism includes using a wireless pairing operation to pair a smartphone with a communication bridge to form a communication path between the smartphone and a router or gateway that will be used to provide internet access to devices of the first network. The smartphone can utilize its cellular network interface to connect to the internet and provide internet connectivity via the communication bridge to the router or gateway which, in turn, enables devices connected to the router or gateway to access the internet without having to connect directly to a separate network provided by the smartphone. Aspects of the disclosure may rely on machine learning to optimize network communications and/or configurations.

Figure 1:
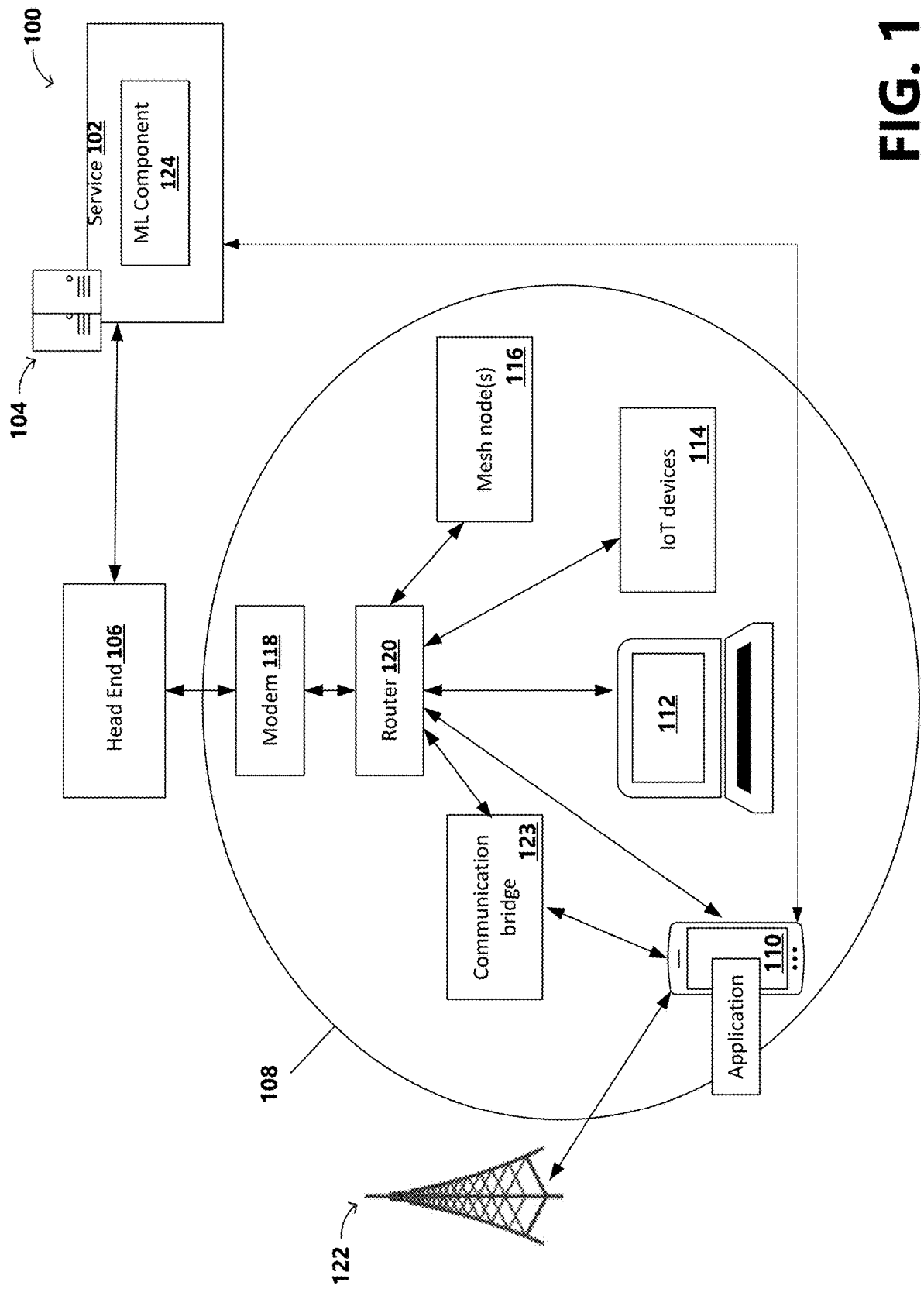
FIG. 1 is a block diagram of an example network environment in which a system of the present disclosure can be implemented.

FIG. 1 is a block diagram of an example environment 100 in which a system of the present disclosure can be implemented. As shown in FIG. 1, the example environment 100 includes a service 102 of an internet service provider (ISP) 104 that is made available by a headend 106 of ISP 104 that receives instructions from the service 102 for providing data services to a subscribing customer or other user. A subscribing customer may include a business or residential customer of ISP 104 that has a plurality of devices located on premises 108 that are capable of connecting to a wide area network (WAN), like the internet, to transmit and receive data.

The devices may be of varying device classes which may be identified according to a media access control (MAC) address or other identifier. The devices may include, but are not limited to personal computers (PCs), mobile devices (e.g., smartphones 110, tablets, laptops 112, personal digital assistants (PDAs)), wearable devices (e.g., smart watches, smart eyewear, fitness trackers, smart clothing, body-mounted devices), and other Internet of Things (IoT) devices 114, such as smart sensors, smart cameras, smart door locks, smart outlets, smart televisions, smart speakers, smart appliances, etc. In some examples, premises 108 may further include a mesh networking system that includes one or more range-extending hardware devices (e.g., mesh nodes 116) distributed about premises 108.

As one non-limiting example, a cable modem termination system (CMTS) located at headend 106 may provide the data services, including cable internet, to customer premise equipment (CPE) located at premises 108 over a hybrid fiber-coaxial (HFC) network, where the CPE then further communicates data services to the devices. A data over cable service interface specification (DOCSIS) standard may be utilized for exchanging data between the CMTS and the CPE. As another non-limiting example, an optical line terminal (OLT) located at headend 106 may provide the data services, including broadband internet access, to the CPE located on premises 108 over a passive optical network (PON). A PON standard may be utilized for exchanging data between the OLT and the CPE. In further examples, ISP 104 may provide data services using any type of non-cellular telecommunication technology and associated standard.

The CPE may include at least a modem 118 and a router 120 connected to modem 118 via cabling such as Ethernet cable (e.g., CAT 5, 6, 7, 8, etc.). Modem 118 may receive data signals transmitted from headend 106 (e.g., from the CMTS or OLT), translate the signals such that the signals are interpretable by the devices, and provide the signals to router 120. Router 120 may form a first network (see FIG. 2 first network 202) to provide translated signals to devices that are connected to the first network (a Wi-Fi network). In some examples, functionalities of modem 118 and router 120 may be built into a single device sometimes referred to as a gateway or a combined modem/router. One such example is a Cox® Panoramic Wi-Fi Gateway. CPE may provide services using any non-cellular telecommunication standard, including the above-described DOCSIS or PON standard. In some examples, CPE may further include one or more additional devices or accessories communicatively connected to router 120, such as range extenders, that may extend a range of the data signals output and input to router 120.

Router 120 may be associated with one or more service set identifiers (SSIDs) identifying one or more respective networks formed by the router 120, including the first network (e.g., SSID1/password1) over which the data services of the ISP are provided. Each SSID may be associated with a unique password that is used to authorize the devices to connect to the network. For the first network formed by the router 120 over which the data services of the ISP are provided, a first SSID (SSID1) identifies the first network and a first password (password1) is used to enable the devices to connect to and utilize the first network. Once the correct password is submitted, the devices may be referred to as connected devices with respect to router 120.

When data signals from headend 106 are received and translated at modem 118, connection of router 120 to modem 118 enables router 120 to receive the signals for transmission to the connected devices over the first network. Additionally, when premises 108 further includes a mesh networking system, mesh nodes 116 may be connected to the first network to enable the data signals transmitted by router 120 over the first network to be further extended to devices distributed across different rooms or locations of premise 116 that are not close to the router 120, for example. Resultantly, the connected devices may access data services provided by the ISP 104 (e.g., may access the internet or obtain internet connectivity) over the first network. This may be a primary internet access mode for the devices on the premises 108, which may also be referred to as a non-cellular internet connection source.

As shown in FIG. 1, environment 100 further includes a device having a cellular network interface at premises 108, such as smartphone 110 for example, that may be connected to a cellular network via a base station 122 of the cellular network. A cellular carrier, which may be a same or different entity as ISP 104, may provide cellular services over the cellular network. One non-limiting, example type of cellular network may include a Long-Term Evolution (LTE) network. The cellular device (e.g., the smartphone 110) may be paired to a communication bridge 123 over a wired or wireless connection, including over Bluetooth®, Wi-Fi, Zigbee, USB, etc., For example, communication bridge 123 may include a pairing button that, when pressed, allows smartphone 110 to discover and wirelessly pair with communication bridge 123.

A port of communication bridge 123 may be coupled with an Ethernet port of router 120 to provide a communication channel, via communication bridge 123, between smartphone 110 and router 120. Pairing and/or other communication data (e.g., SSID, password, model, MAC address, device ID, etc.) may be stored at smartphone 110, router 120, ISP 104, etc., Once paired successfully, an acknowledgement of the successful pairing may be provided from router 120 to smartphone 110, acknowledging the established communication channel and pairing data specific to the pairing between router 120 and smartphone 110 may be stored.

In one aspect, once successfully paired to communication bridge 123 via a wireless signal, smartphone 110 may be used as a failover device to provide an internet connection source when an internet connection is unavailable or an unacceptable service is provided via modem 118. Resultantly, if router 120 detects a disruption in the ISP data services (e.g., detects that data signals from the headend 106 are no longer being received via the modem 118), a failover module 109 of router 120 (or a gateway) may utilize the established communication channel to initiate a failover service to the cellular network via smartphone 110, as described in more detail below. If router 120 is also malfunctioning, smartphone 110 may be used in a conventional manner requiring each device to connect directly to smartphone 110. In some examples, pairing of router 120 and communication bridge 123 may occur prior to a disruption in the ISP data services at modem 118 or automatically in response to detecting a disruption or unacceptable signal quality at modem 118.

As described below, when there is a disruption or reduction in quality of the signal from ISP 104 for example, a failover mode is initiated to rely on smartphone 110 to serve as an internet source so that router 120 is able to provide internet access to one or more connected devices via the smartphone 110 network interface with the cellular network or service. According to an aspect, when router 120 detects a disruption in the ISP data services (e.g., detects that data signals from the headend 106 are no longer being received via the modem 118), failover module 109 of router 120 generates and transmits, using the stored pairing data, a communication to smartphone 110 to prompt activation of the failover mode to utilize a cellular network interface of smartphone 110 to access internet services via a cellular network. In another aspect, ISP 104 may send a signal to smartphone 110 via the cellular network to initiate failover operations to the cellular network.

In some examples, the failover prompt communication may include a command that may be executed upon receipt at smartphone 110 to automatically cause the activation of the failover mode and rely on the cellular network for internet. In other examples, the communication may be a notification that is provided for display to a user via a user interface of smartphone 110 (e.g., a user interface of a failover or network control application). The notification may indicate that ISP data services have been disrupted and prompt the customer to activate the failover mode of smartphone 110. Activation of the failover mode may occur automatically to cause smartphone 110 to now act as a modem for receiving data signals, including internet data signals, from a cellular carrier (e.g., the internet access included as part of the cellular services provided by cellular carrier).

Once the failover mode is activated, smartphone 110 may enable one or more of the plurality of devices to regain internet connectivity via its connection to the cellular network. Once enabled as a hotspot, smartphone 110 may produce a second network associated with a second SSID and a second password that is different from the first SSID and the first password of the first network formed by router 120 to which the plurality of devices are currently connected. This second network (second network 204 of FIG. 2) is utilized to communicate non-cellular data between smartphone 110 and communication bridge 123.

Conventionally, a customer would have to configure each of the devices individually (e.g., configure device-by-device) to connect them to the second network. For example, the customer must go into network settings of each device, select the second network to connect to (corresponding to the second SSID), and enter the second password. Such a conventional procedure may be error prone, time consuming, and frustrating, especially given the large number of devices that may be associated with router 120 and considering the timeliness of accessing the internet to perform essential activities or services. Additionally, the strength of the signals provided over the second network via the cellular device may be weaker than the strength of signals provided by router 120. The larger bandwidth and power capabilities of router 120 may also be a factor in utilizing router 120 to provide router functions rather than smartphone 110.

As an example, to address and overcome these networking and connectivity issues, according to an aspect a system utilizes a failover module 109 in part to implement a failover mode in a failover scenario, that utilizes smartphone 110 to wirelessly provide non-cellular data signals translated from cellular signals to communication bridge 123 and then to router 120 so that router 120 may then transmit the data signals to at least a subset of the plurality of devices connected to router 120 over the first network. The failover module 109 may be included as part of the functionality of smartphone 110, router 120 (see FIG. 2), modem 118, or some other component. By ultimately directing the signals from router 120 to the subset of devices over the first network to which the plurality of devices are already connected to, users no longer have to individually configure each device to connect to the second network provided via a hotspot of smartphone 110 (and then back to the first network once ISP data services resume). Additionally, the strength of Wi-Fi signals provided by router 120 are typically greater than a strength of Wi-Fi signals had they been provided by smartphone 110 over the second network.

Often, cellular devices have one or more different tether modes to allow a cellular device to provide internet connectivity to other devices. A first example tether mode may be enabled through a dongle, which is a small piece of computer hardware that connects to a port on another device to provide it with additional functionality. For example, the dongle may be connectable to a port of the cellular device to provide the cellular device an Ethernet port to which another device can be connected to obtain Internet connectivity. A second example tether mode may be enabled through Bluetooth® technology (e.g., via Bluetooth® communications transmitted between the cellular device and another device having Bluetooth® capability). A third example tether mode may be enabled by the cellular device acting as a wireless access point, via which another device connects, to obtain internet connectivity.

While each of these example tether modes enable Internet data signals to be exchanged between the cellular device and another device (e.g., such as the laptop), for various reasons, these tether modes would be less desirable or not successful in enabling internet data signals to be exchanged between router 120 and smartphone 110. For example, dongles are obscure hardware that connect to the CPE that would be required. Additionally, the type of Bluetooth® communications supported by a cellular device and a router are often different, which would prevent successful high speed communication between the two devices via Bluetooth®. While router 120 may be modified to support the same type of Bluetooth® communications as smartphone 110, it may be less desirable to do based on the inability to support high speed data transfer and business costs of supplying new routers to existing customers. Further, because router 120 is acting as an access point for the first network, when smartphone 110 is also acting as an access point for the second network, router 120 and smartphone 110 may not be able to communicate with each other as access points in common configuration may not be able to communicate with each other. Additionally, without proper setup, interference may result between signals transmitted over the first and second networks by smartphone 110 and router 120. Therefore, a solution for enabling communication (e.g., to allow routing of data signals) between smartphone 110 and router 120 is needed.

As one non-limiting example, the solution may be embodied in an intermediary component, also referred to as communication bridge 123, included as part of the system. In some examples, the communication bridge 123 may be included as part of the CPE provided by ISP 104. For example, functionality of each of modem 118, router 120, and communication bridge 123 may be integrated into a single device, such as a communication gateway. In some aspects, router 120 may be communicatively coupled to communication bridge 123 via a wired or wireless connection. As one example, router 120 may be connected with an Ethernet cable to communication bridge 123 via an Ethernet WAN port of router 120. For example, when configuring how the failover mode is to be activated, an application may be used to control a selection of an Ethernet WAN interface to automatically cause a LAN port of router 120 to become an Ethernet WAN port. In some cases, router 120 or gateway may include multiple Ethernet WAN ports.

In one aspect, communication bridge 123 may wirelessly connect to the second network formed by smartphone 110 when the failover mode is activated, which provides connectivity from the Ethernet WAN port of router 120 to the second network. In another aspect, communication bridge 123 may wirelessly connect to a wireless network interface (e.g., Bluetooth type network interface, IEEE 802.11 type network interface, etc.) included with smartphone 110. Accordingly, cellular data signals received at the smartphone 110 may be translated by smartphone 110 to a different wireless protocol (IEEE 802.11 type) and communicated with router 120 via communication bridge 123. As described herein, communication bridge 123 may be included as a separate component external to router 120 (or gateway) or included as part of the hardware of router 120 (or gateway), smartphone 110, or some other device.

In one aspect, communication bridge 123 may include any type of device that includes both wireless and a wired couplings with capability to receive wireless signals from a wireless coupling and bridge the wireless signals to a wired output (and vice versa). For example, communication bridge 123 may be configured as a standalone device that includes a Data Link Protocol: Ethernet, Fast Ethernet, IEEE 802.11a, IEEE 802.11ac, IEEE 802.11b, IEEE 802.11g, IEEE 802.11n; a Wireless Protocol: 802.11a/b/g/n/ac; a Routing Protocol: Static IP routing; a Network/Transport Protocol: L2TP, PPPOE, PPTP; Wi-Fi Bands: 2.4 GHZ/5 GHZ; Features: Access Control List (ACL) support, Bandwidth control, DHCP client, DHCP server, DMZ port, DOS attack prevention, Dynamic DNS server, IPv4 support, Manageable, Parental control, Port triggering, Reset button, Stateful Packet Inspection Firewall (SPIF), Virtual server support, VPN passthrough, WDS bridge, Wi-Fi Multimedia (WMM) support, Wi-Fi Protected Setup (WPS), Wireless extender mode; and Interfaces: USB 2.0:1×4 pin USB Type A, WAN/LAN: 1×10Base-T/100Base-TX-RJ-45 (see for example TL-WR902AC|AC750 Wireless Travel Router by TP-Link).

Communication bridge 123 may serve as a hotspot extender mode to bridge an ethernet port connected to router 120 to smartphone 110 (e.g., wireless interface of communication bridge 123 as a Wi-Fi client). When the communication bridge 123 is wirelessly paired with smartphone 110 and wired to router 120 via Ethernet cabling, Wi-Fi Clients of the first network are able to rely on smartphone 110 as an internet connectivity source via communication bridge 123 wired coupling to router 120 (or gateway). As described above, communication bridge 123 may be wirelessly paired to a hotspot provided by smartphone 110 by configuring communication bridge 123 with the SSID and password of smartphone 110. The configuring of communication bridge 123 may be done before a failover issue occurs or at a time of failure.

In some aspects, communication bridge 123 can include Network Address Translation (NAT) capability to map a first IP address space (e.g., an IP address space associated with the first network formed by router 120) into a second IP address space (e.g., an IP address space associated with the second network formed by smartphone 110) by modifying network address information in IP headers of data signal packets while they are in transit between router 120 and smartphone 110 across communication bridge 123. Resultantly, communication bridge 123 serves as a communication intermediary between smartphone 110 and router 120 to translate wireless signals to Ethernet signals when the failover mode is activated to enable cellular data signals provided over a cellular network to be translated into non-cellular data signals which are received at router 120 for sending to the plurality of connected devices over the first network. Similarly, data signals sent by connected devices over the first network to router 120 can be received at smartphone 110, via communication bridge 123 (e.g., translating Ethernet signals to wireless signals), for transmission by smartphone 110 over the cellular network.

In one non-limiting example, communication bridge 123 may be manufactured as part of a tri-band Wi-Fi radio, such as a Cox® Panoramic Wi-Fi Pod 2.0, that is adapted such that one of the three radios may be configured as a Wi-Fi client and another of the three radios is configured as an access point. In such an example, the router may also include software that is executable to enable the router to prioritize one of the radios and configure the prioritized radio as the Wi-Fi client to communicate with the router 120. While the specific examples provided in this disclosure describe a system that utilizes a communication bridge 123 during a failover mode to provide connectivity between router 120 and smartphone 110, it is not so limited. In other examples, router 120 may implement high speed Bluetooth® data transfer protocols that are supported by smartphone 110 to allow the direct routing of data signals between router 120 and smartphone 110 over Bluetooth®. In further examples, a translation mechanism may be implemented with communication bridge 123 that translates information from an Ethernet-to-Wi-Fi protocol and vice versa to allow data signals to be routed between router 120 and smartphone 110 over Ethernet layer 2 and IEEE 802.11ac layer 2.

Service 102 of ISP 104 includes one or more server machines and supporting communication infrastructure communicatively coupled to at least one of modem 118, router 120, the connected devices, and/or smartphone 110. According to an aspect, service 102 of ISP 104 utilizes a machine learning component 124 as part of a failover service that operates in part to determine a prioritized ranking of devices that may be given priority to access internet services when the failover mode is activated and smartphone 110 provides the internet access via its connection to a cellular network. The service 102 of ISP 104 may be communicatively coupled to a service of a cellular carrier to enable information about the cellular network to be received and utilized by service 102, and specifically by machine learning component 124.

According to an aspect, machine learning component 124 may be configured with a machine learning algorithm trained in part using one or more server machines of ISP 104 using various types of input data including current, past, and projected network conditions, device locations, device types, data usage by type of device, operational characteristics and/or configurations of each device, interference conditions between devices, and/or other device and/or signal behaviors to optimize configuration of connected devices of the first network when running in the failover mode. For example, machine learning component 124 may be executed to determine a subset of the plurality of devices that remain connected to router 120 based on a projected load and/or historical RF and/or cellular operational characteristics of smartphone 110, router 120, all or a subset of the devices of the first network, etc. As one example, machine learning component 124 may quantify most frequently used device types, most frequently used application types, locations within a premise of the plurality of the devices, a distance from the locations to the router, an ability of one or more of the plurality of the devices to connect in a deadspot, etc.

According to one aspect, machine learning component 124 may execute to rank devices as a priority ranking that will remain connected to router 120 when operating in the failover mode. Router 120 settings may be automatically or manually adjusted to account for any network configuration changes. For example, machine learning component 124 may output some number of devices to remain associated with first network which may be automatically implemented by configuring radios of router 120 or presented to a user on a user interface of smartphone 110 (via the application) or some other user device to allow a user to accept, reject, or configure which devices remain connected. Machine learning component 124 may provide a prioritized ranking of devices to remain associated with the first network when smartphone 110 is activated as the internet connection source provided via a cellular network. The prioritized ranking of devices may be communicated to a user for acceptance or modification. The priority rankings, machine learning parameters, device types, radio capabilities/configurations, device topologies, device locations, and/or other operational and/or configuration parameters may be stored and deleted as the first network evolves and changes. For example, operational parameters to be used as part of a failover scenario may be stored using hardware/software of one or more of ISP 104, CPE, router 120, gateway, smartphone 110, etc.

Machine learning component 124 may be operative or configured to evaluate a variety of operational parameters including, but not limited to, historical connectivity data, client behavior, application types and usages, RF topologies, mobility considerations, etc. as part of ranking devices to prioritize allowing internet connectivity while in the failover mode. The machine learning component 124 may also be used when not in the failover mode. In some examples, machine learning component 124 uses one or more unsupervised machine learning techniques (e.g., self-organizing maps, nearest-neighbor mapping, k-means clustering and singular value decomposition) to explore a dataset/datasets (e.g., historical data) for identifying and learning patterns within the connectivity and/or usage data. In some examples, machine learning component 124 may use one or a combination of other machine learning techniques (e.g., supervised machine learning, semi-supervised machine learning, reinforcement learning, etc.) for generating a machine-learned model or failover algorithm.

As described here, an application may be used in conjunction with enabling or disabling the failover mode, pairing devices, configuring network settings and/or devices, etc. The application may be associated with router 120 or a standalone gateway device and executed from smartphone 110, a device such as a laptop or tablet, or a desktop for example. The application may also be used to manage pairing of smartphone 110 and router 120 along with generating and/or storing pairing data to be used when pairing. As described above, once smartphone 110 is paired with communication bridge 123 and communication bridge 123 is coupled to router 120 (or gateway), the failover mode may be automatically initiated via failover module 109 to rely on smartphone 110 as the internet connectivity source. In some aspects, output from machine learning component 124 may be provided to router 120 (or gateway) and/or smartphone 110 for use by the application as part of the failover mode or for configuring the first and/or second networks when the failover mode executes.

Figure 2:
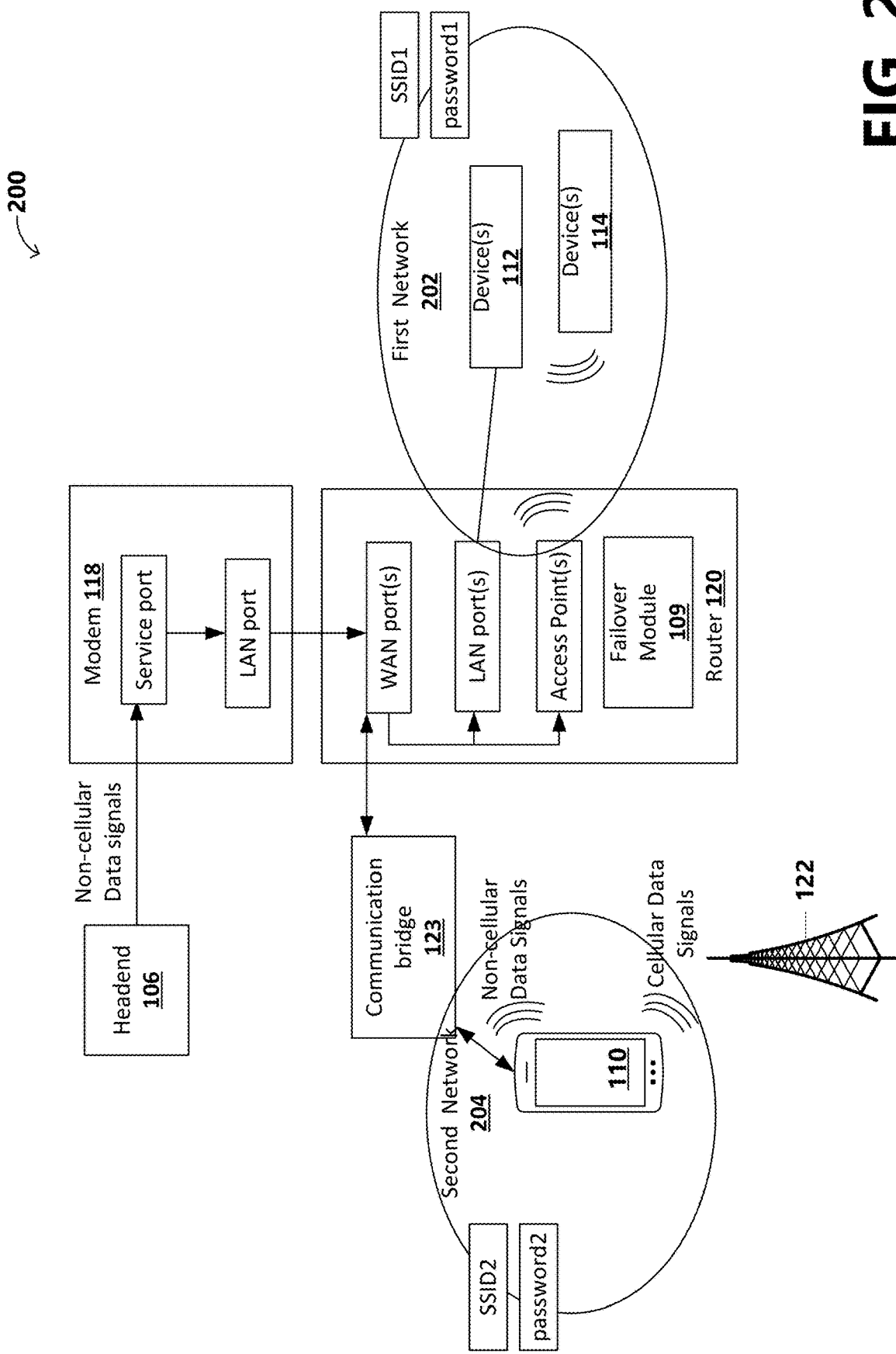
FIG. 2 is a block diagram of a system configured to provide a failover service.

FIG. 2 is a block diagram of a system 200 of an aspect configured to provide a failover service when modem 118 (or gateway) is not receiving a non-cellular signal from headend 106. The failover service can also be implemented when a strength or communication speed of the non-cellular signal falls below a defined threshold. For this example, modem 118 and router 120 are integrated into a single gateway device and the communication bridge 123 is shown as an external component. As described above for an example implementation, communication bridge 123 is wirelessly paired with smartphone 110 and wired to router 120 using an Ethernet cable.

As shown in FIG. 2, a first network 202 is provided by router 120 using SSID1 and password1 that devices 112, 114 for example may use to join first network 202. For this example, smartphone 110 has been wirelessly paired and connected with communication bridge 123 for use in the failover service to serve as a modem device via its cellular connection with base station 122 instead of modem 118. Smartphone 110 may use its internal radio(s)/antennas(s) for both pairing operations with router 120 and/or communication bridge 123. Smartphone 110 also includes functionality to translate cellular data signals into non-cellular data signals (e.g., into IEEE 802.11 type signals). Once paired and in failover mode, smartphone 110 can translate cellular data signals into non-cellular data signals and vice versa for providing an internet connectivity source to devices connected to first network 202.

Once enabled as a hotspot, smartphone 110 provides a second network identified by SSID2/password2 for example that may be used to interface wirelessly with communication bridge 123. Once the failover mode is activated, smartphone 110 uses its cellular connection to provide the internet connectivity source to devices connected to first network 202 via communication bridge 123. When modem 118 once again receives non-cellular data signals from headend 106 (or the signal quality reaches a desired threshold), the failover mode may be deactivated in a number of ways. For example, the failover mode may be deactivated by disabling the hotspot of smartphone 110, unpairing smartphone 110 and communication bridge 123 by sending a notification to unpair from router 120 or ISP 104, to smartphone 110, communication bridge 123 or router 120 can discontinue use of the Ethernet interface to disconnect communication bridge 123, etc. As one example, ISP 104 may notify smartphone 110 via a cellular communication notification (e.g. text or failover application notification) to discontinue its wireless connection with communication bridge 123 and router 120 resumes communications with modem 118 using the non-cellular data signals communicated via headend 106.

Figure 3:
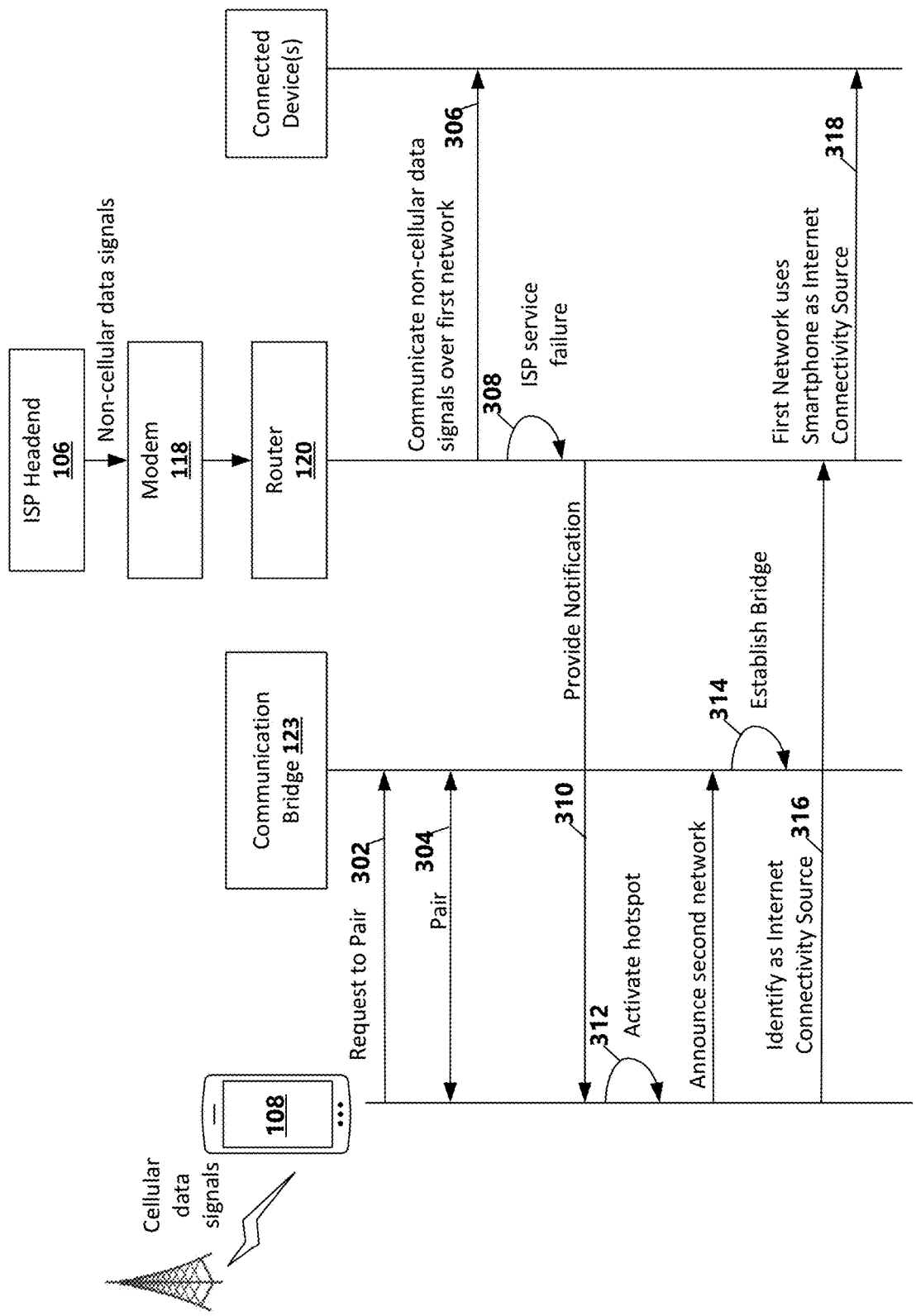
FIG. 3 is a high-level communication diagram of an exemplary failover service.

FIG. 3 is a high-level communication diagram of a failover service of an embodiment. At 302, smartphone 110 transmits a pairing request to communication bridge 123. Alternatively, at 302, communication bridge 123 may be activated to transmit a pairing request to smartphone 110. For example, communication bridge 123 may include a pairing button that may be pressed to initiate a pairing procedure with smartphone 110 over a wireless channel (e.g., Bluetooth®, Wi-Fi, Zigbee, etc.). The pairing operation may be automatic, set up before a failure of modem 118, or once an issue occurs. For example, if an operational issue impacts delivery of non-cellular data signals from modem 118 to router 120, ISP 104 may send a failover request notification to smartphone 110 to being pairing.

Automatic pairing may also be implemented if a user authorizes use of smartphone 110 as a failover internet connectivity source (e.g., using a failover application installed on smartphone 110). In some aspects, when a communication issue affects delivery of non-cellular data signals from modem 118, router 120 may advertise a pairing request with communication bridge 123 which is provided to smartphone 110 to pair with communication bridge 123. When communication bridge 123 is integrated with modem 118 and router 120 into a single device, pairing operations occur internally between smartphone 110 and the single gateway device.

At 304, and for this example, smartphone 110 is communicatively paired with communication bridge 123) and ready to provide a failover service (e.g., on standby). At 306, router 120 communicates non-cellular data signals via first network 202 with any connected devices as modem 118 receives non-cellular data signals from headend 106 (e.g., normal operation). At 308, router 120 detects a service failure due to non-receipt of non-cellular data signals and/or inadequate signal quality. At 310, failover module 109 of router 120 provides a notification to smartphone 110 via communication bridge 123 to activate the failover mode.

At 312, smartphone 110 activates the failover mode to serve as the internet connectivity source by communicating with base station 122 using its cellular network interface. For this example, communication bridge 123 has been connected to router 120 with Ethernet cabling and a wireless communication channel has been established between smartphone 110 and communication bridge 123 at 314. At 316, smartphone 110 notifies router 120 that it is connected to the cellular network and able to provide the internet connectivity source for first network 202. At 318, devices connected to the first network 202 are now able to rely on smartphone 110 as the internet connectivity source since smartphone 110 is connected to the internet via base station 122 and to first network 202 via communication bridge 123.

Figure 4:
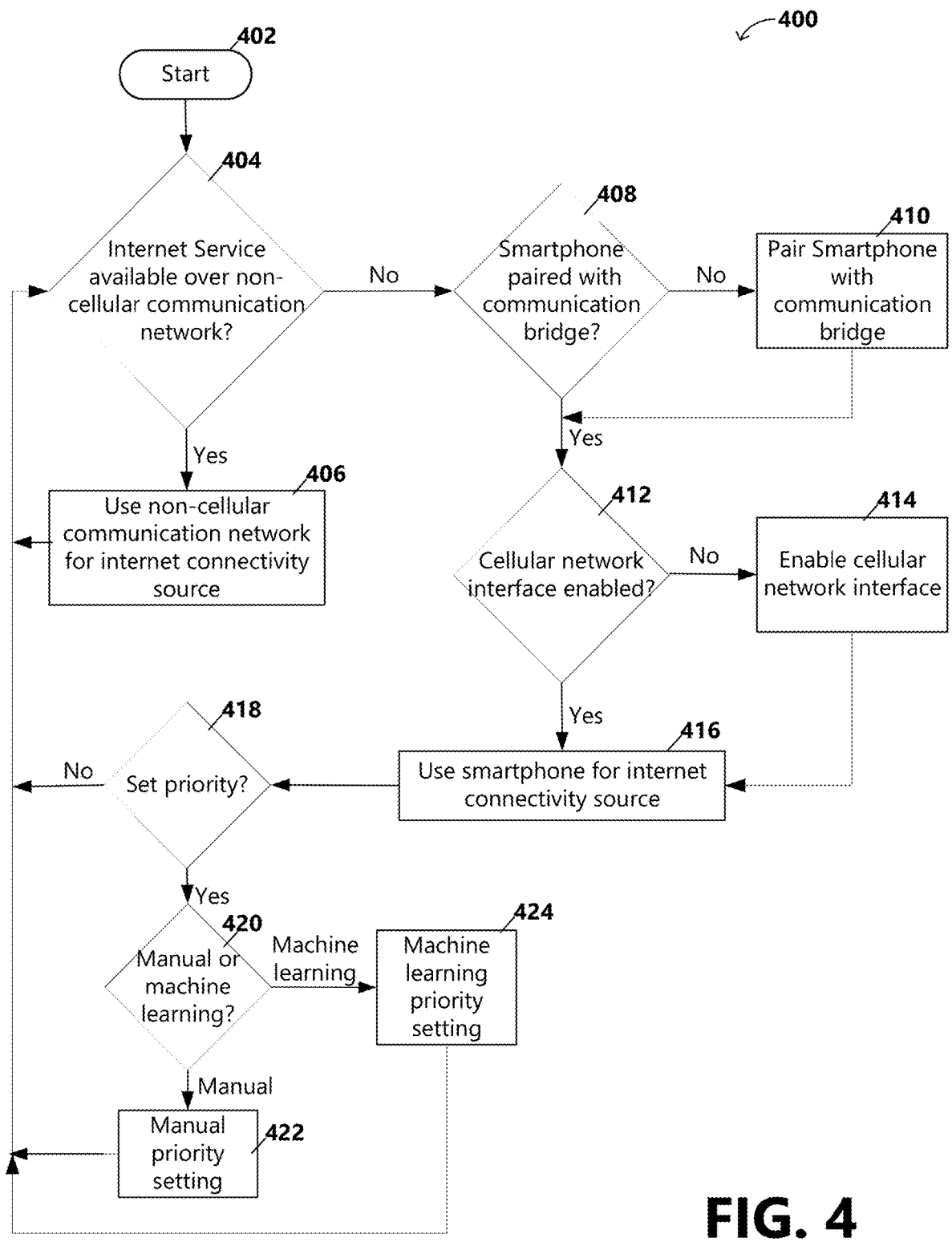
FIG. 4 is a flow diagram depicting an exemplary method of providing an failover service.

FIG. 4 is a flow diagram depicting an exemplary method 400 of providing a failover service for a communication network. Method 400 begins at 402 and proceeds to 404 where a determination is made as to whether internet services are available over a non-cellular communication network, such service provided via infrastructure of a hybrid or all fiber distribution network. For example, headend 106 may provide internet service to modem 118 which is used by router 120 to provide internet communications over first network 202 to one or more connected devices. If internet services are available over the non-cellular communication network at 404, method 400 proceeds to 406 and relies on the non-cellular communication network for internet service.

If internet services are not available over the non-cellular communication network at 404, method 400 proceeds to 408 where method 400 initiates a failover mode by determining if smartphone 110 is paired with communication bridge 123. If smartphone 110 is not paired with communication bridge 123, a pairing procedure is used to pair smartphone 110 with communication bridge 123 at 410. As described herein, pairing may occur before activating the failover mode or may occur once the failover mode is activated. At 412, method 400 determines if smartphone 110 is connected to a cellular network. For example, smartphone 110 may not have its cellular network interface enabled.

If smartphone 110 is not connected to the cellular network at 412, process 400 at 414 uses smartphone 110 to enable its cellular network interface to connect to a cellular network and receive cellular data signals from a cellular service. For example, router 120 or ISP 104 may notify smartphone 110 to enable its cellular network interface if internet connectivity is still unavailable for first network 202 while in the failover mode. Once smartphone 110 is connected to the cellular network, at 416 method 400 relies on smartphone 110 and the cellular network as the internet connectivity source for devices connected via first network 202.

As described above, smartphone 110 translates cellular data signals communicate via the cellular network into non-cellular data signals which are provided wirelessly to communication bridge 123 which in turn provides the non-cellular data signals to router 120 for communication to one or more connected devices via first network 202. In some cases, communication bridge 123 operates to translate Wi-Fi layer 2 data signals to Ethernet layer 2 for communicating with router 120. At 418, method 400 determines whether a device priority should be applied for connected devices when relying on the smartphone 110 as the internet connectivity source when in the failover mode.

If there is no device priority to be applied at 418, method 400 returns to 404. If there is a device priority to be applied at 418, method 400 proceeds to 420 to determine whether a device priority is to be applied manually or automatically based on machine learning. If device priority is to be applied manually, method 400 proceeds to 422 and prompts a user via smartphone 110 or another user device to manually select which devices are allowed to use the failover internet service. For example, a failover application installed on smartphone 110 and integrated with router 120 may be used to select which devices are given priority and allowed to access the internet service provided via smartphone 110 and the cellular network, wherein the device priority selection is then communicated to router 120 for implementation.

If device priority is to be applied automatically according to machine learning, method 400 proceeds to 424 and prioritizes devices that are allowed to access the internet service provided via smartphone 110 and the cellular network. Based on the manual or automatic device selection, router 120 can configure its radio(s) and/or LAN ports to disable communication with particular devices over first network 202 when using smartphone 110 as the internet connectivity source. Manual or automatic device selection may also be used when not in the failover mode.

Figure 5:
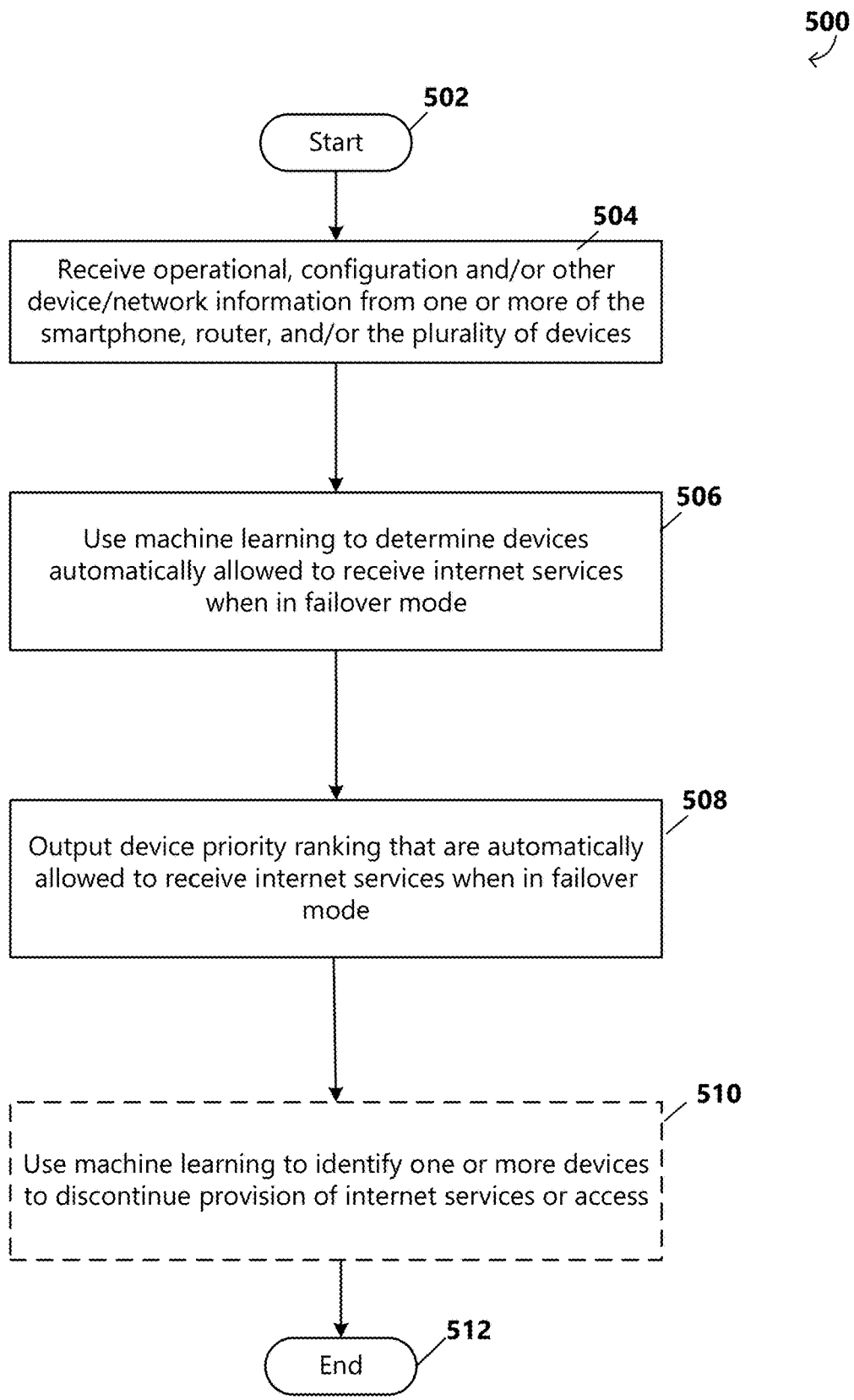
FIG. 5 is a flow diagram depicting an exemplary method of using machine learning to automatically determine which devices are allowed to access an internet service.

FIG. 5 is a flow diagram depicting an exemplary method 500 of using machine learning component 124 to automatically determine which devices are allowed to access the internet service provided via smartphone 110 and the cellular network when in the failover mode. Machine learning component 124 may utilize supervised, unsupervised, and/or hybrid learning methods as part of determining device priority for various devices located on premises 108 to access internet services while in failover mode. Machine learning component 124 may be trained using various types of input data including current, past, and projected network conditions, device locations, device types, data usage by type of device, operational characteristics and/or capabilities of each device, interference conditions between devices, application usage and/or types, etc.

Method 500 begins at 502 and proceeds to 504 where one or more server machines running the machine learning component 124 (e.g., of ISP 104) and associated algorithm(s) receives operational, configuration, and/or other device/network information from one or more of smartphone 110, router 120 (or gateway), and/or devices associated with first network 202 before and/or after activation of the failover mode. Machine learning component 124 may utilize prior historical operational and/or configuration information associated with devices of the first network 202 when automatically determining which devices will be allowed to remain connected to the first network 202 when the failover mode is activated.

At 506, method 500 uses machine learning component 124 and the received input to determine one or more of the devices (or a subset) that may be automatically allowed to receive internet services when connected to the first network 202 and in the failover mode. In some cases, machine learning component 124 may also account for priority of a type of device or service when determining which devices to automatically allow internet access during the failover mode. For example, a security system or critical transaction services may be prioritized ahead of other devices or applications and taken into account by machine learning component 124 when outputting a prioritized device ranking.

At 508, process 500 uses machine learning component 124 to output one or more of the devices by a priority ranking which may be allowed to access internet services via the internet connectivity source of smartphone when the failover mode is activated. For example, the top three ranked devices may be given priority during the failover mode. The devices that are allowed to access internet services via the internet connectivity source of smartphone may be automatically implemented by router 120 (or gateway) or the prioritized ranking output may be transmitted to an application user interface of smartphone 110 or another user device to enable a user to accept the machine learned connection configuration or make any changes to the which devices are allowed to access the internet services.

Output of machine learning component 124 may also be used to notify a user to move one or more devices that are allowed to connect to the first network 202 closer to router 120. Optionally, at 510 process 500 uses machine learning component 124 to identify one or more devices to discontinue provision of internet services during the failover mode if operational characteristics of a connected device, smartphone 110, and/or the cellular network degrade, such as a bandwidth constraint, signal loss associated with cellular network, device located too far from router 120, etc. Method 500 then ends at 512.

Figure 6B:
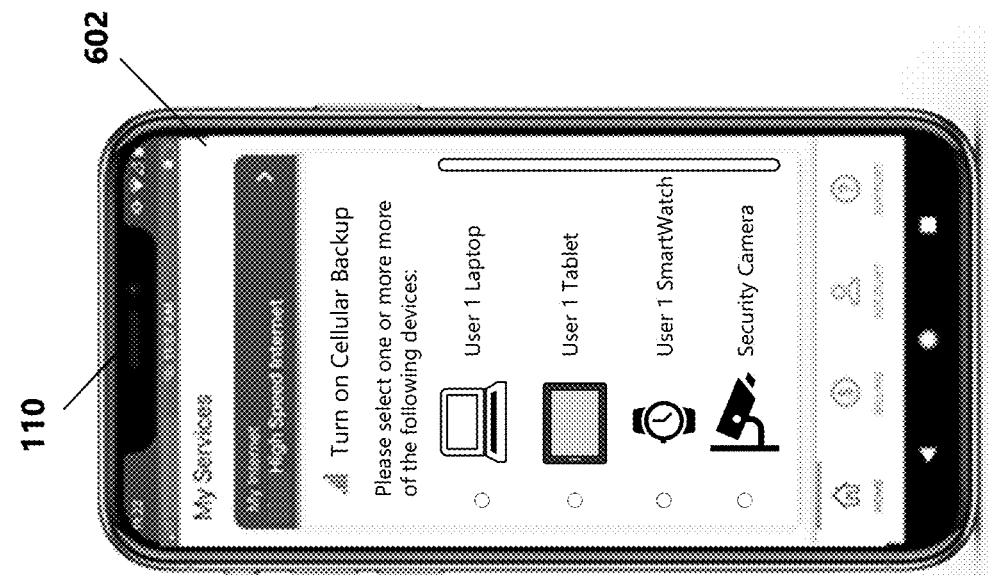
FIGS. 6A-6C depict a smartphone and an exemplary application user interface (UI) that may be utilized as part of providing a failover service.
Figure 6A:
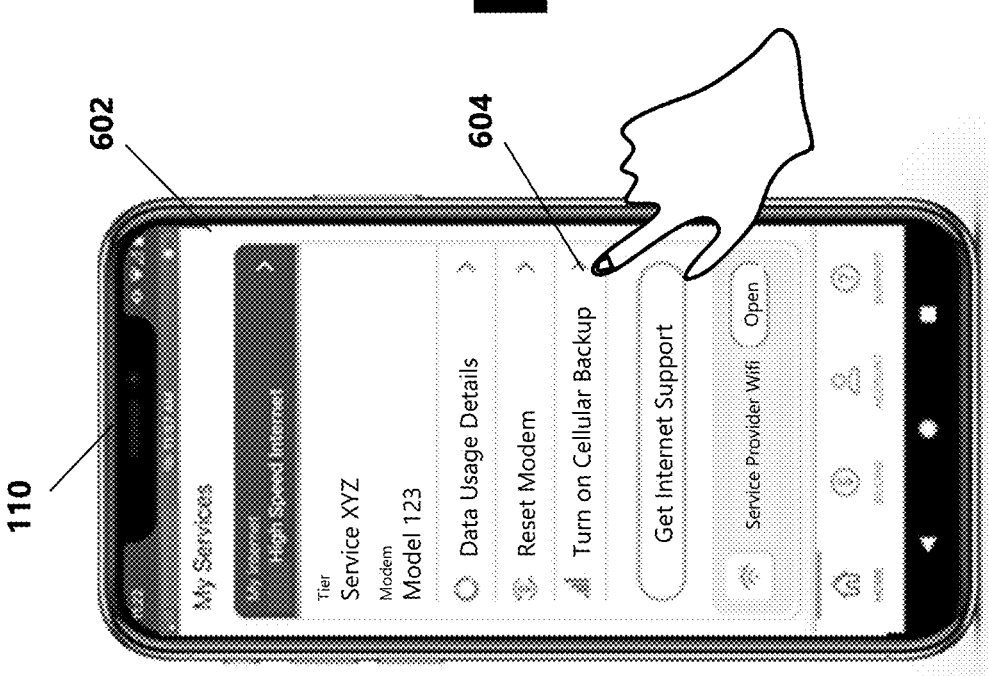
Figure 6C:
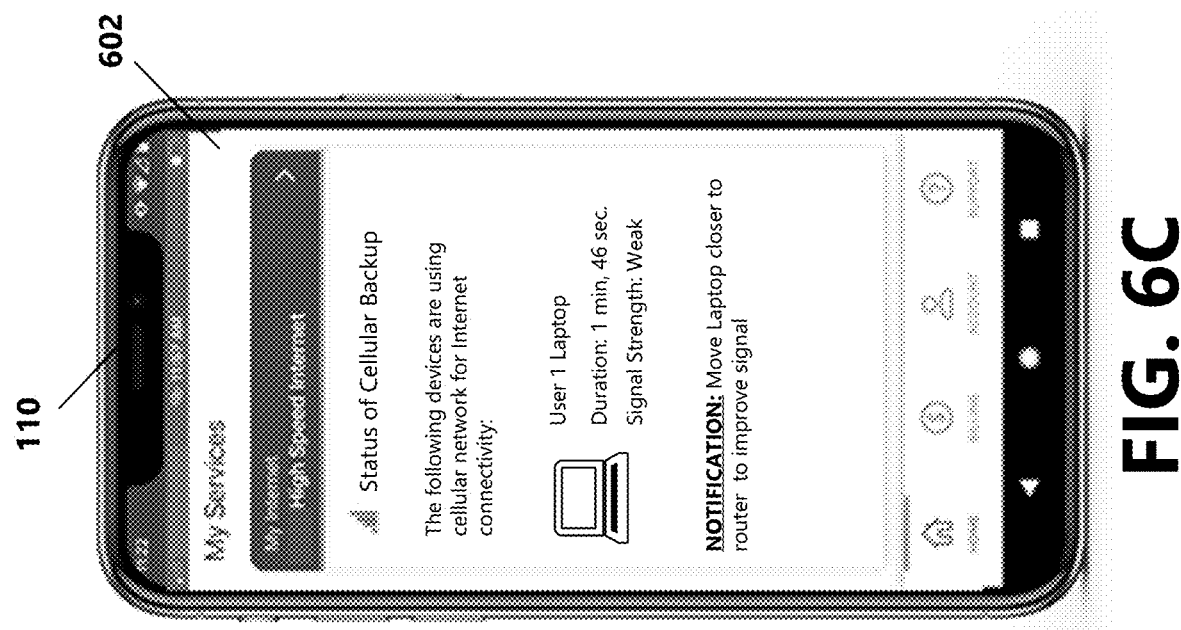

FIGS. 6A-6C depict a smartphone 110 and an exemplary application user interface (UI) 602 that may be utilized as part of providing a failover service. As shown in FIG. 6A, a user has selected "Turn on cellular backup" option 604 via UI 602. In response to selection of the "Turn on cellular backup" option 604 via UI 602, a next screen of UI 602 is provided that allows a user to manually select devices allowed to remain connected to the first network 202 when the failover mode is activated and smartphone 110 is used as an internet connectivity source. FIG. 6C shows yet another screen of UI 602 during the failover mode informing a user to move a device closer to router 120 to improve a signal strength as a result of machine learning. In some cases, machine learning component 124 may interface with the failover application to provide network insight and notifications via UI 602. While not shown, UI 602 may also be used to accept or reject devices allowed to remain connected to the first network 202 when the failover mode is activated based on output of machine learning component 124. Similarly, the failover application may be used when pairing or troubleshooting smartphone 110 and communication bridge 123.

Figure 7:
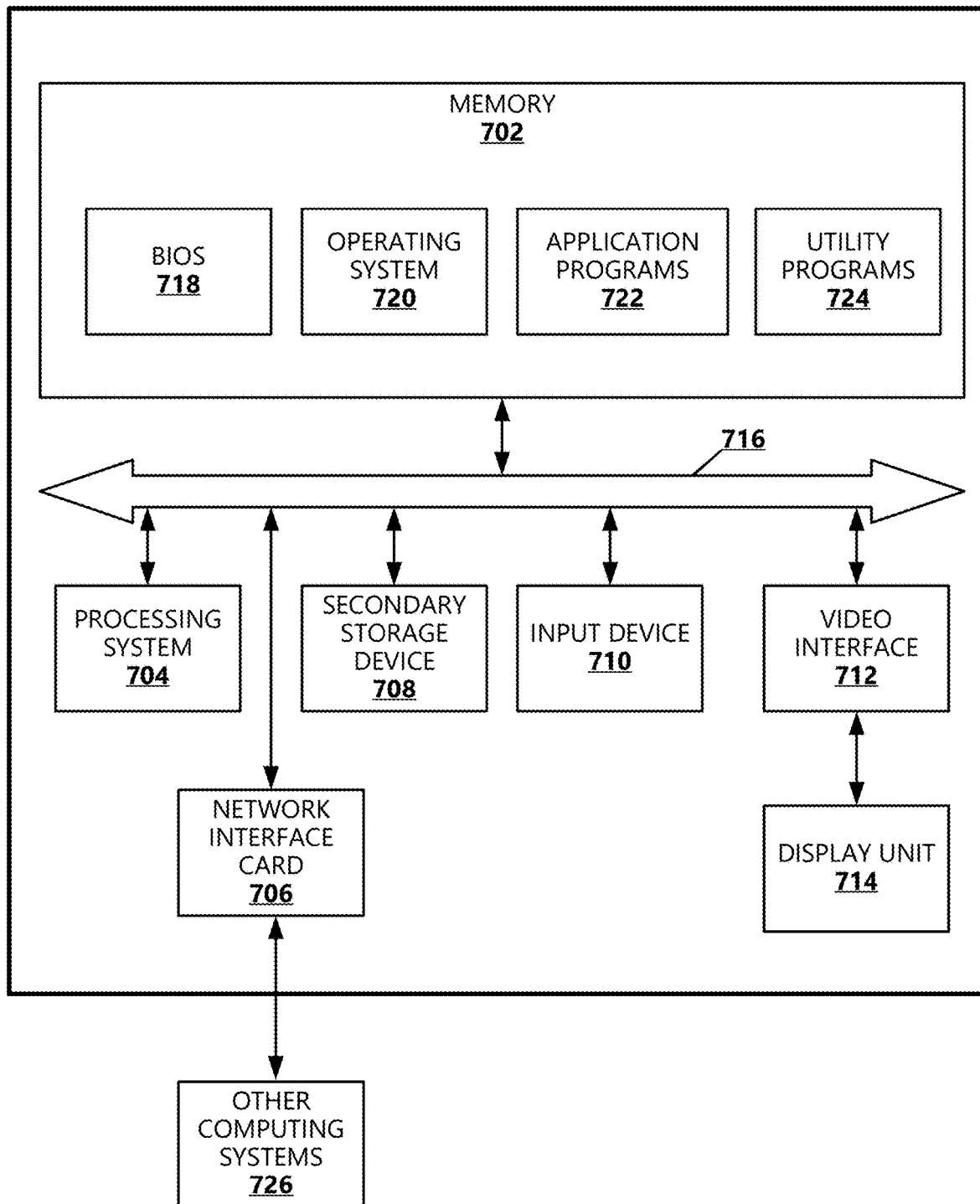
FIG. 7 is a block diagram illustrating example physical components of a computing device or system with which embodiments may be practiced.

FIG. 7 is a block diagram illustrating example physical components of a computing device 700 or system with which embodiments may be practiced as part of providing a failover service. It should be appreciated that in other embodiments, different hardware components other than those illustrated in the example of FIG. 7 may be used. Computing devices may be implemented in different ways in different embodiments. For instance, in the example of FIG. 7, the computing device 700 includes a processing system 704, memory 702, a network interface card 706 (wired and/or wireless, cellular type, 802.11 type, etc.), a secondary storage device 708, an input device 710, a video interface 712, a display unit 714, and a communications medium 716. In other embodiments, the computing device 700 may be implemented using more or fewer hardware components (e.g., a video interface, a display unit, or an input device) or in combination with other types of computer systems and applications 726.

The memory 702 includes one or more computer-readable storage media capable of storing data and/or computer-executable instructions. Memory 702 may store the computer-executable instructions that, when executed by a processor of the processing system 704, cause allocation and/or reallocation operations as part of load balancing internal connections. In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, applications, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., cellular, WI-FI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 or program code that, when executed by the processing system 704, cause the computing device 700 to provide applications (e.g., application 128) to users. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to, wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPOE), etc. including any combination thereof.

Figure 8:
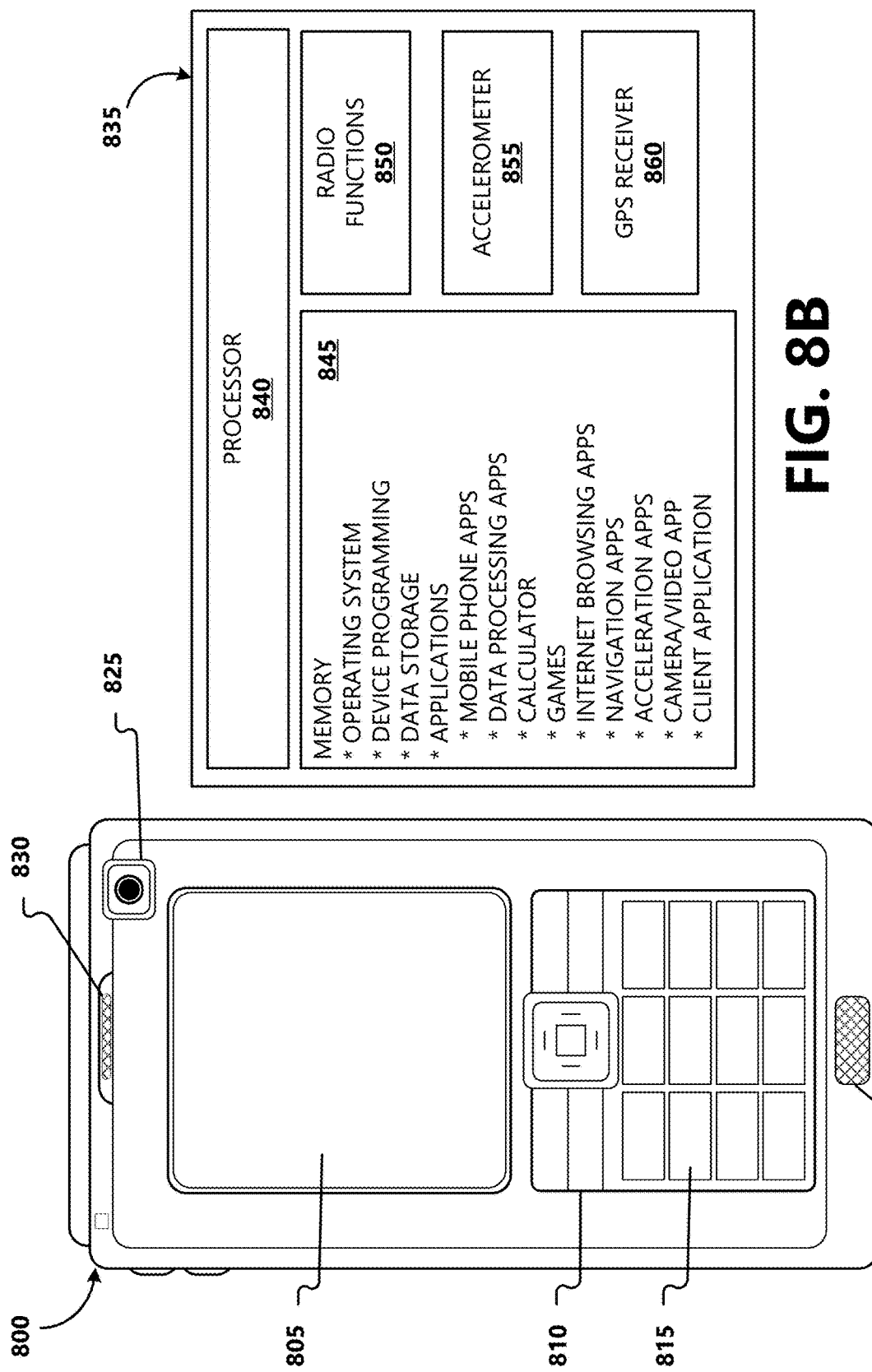
FIGS. 8A and 8B are block diagrams illustrating example physical components of a suitable mobile computing environment with which aspects of the present disclosure can be practiced.

FIGS. 8A-8B illustrate a suitable mobile computing device 800 or environment, for example, a mobile computing device or smartphone, a tablet personal computer, a laptop computer, or other end device 108, with which aspects can be practiced. The mobile computing device 800 is illustrative of any suitable device operative to send, receive and process wireless communications, as well as run applications (e.g., application 126). A display screen 805 is operative for displaying a variety of information such as information about incoming and outgoing communications, as well as, a variety of data and displayable objects, for example, text, alphanumeric data, photographs, and the like.

Data input to the mobile computing device 800 can be performed via a variety of suitable means, such as, touch screen input via the display screen 805, keyboard or keypad input via a data entry area 810, key input via one or more selectable buttons or controls 815, voice input via a microphone 818 disposed on the mobile computing device 800, photographic input via a camera 825 functionality associated with the mobile computing device 800, or any other suitable input means. Data can be output via the mobile computing device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a computer processor for processing incoming and outgoing data and communications and controlling operation of the device and associated software applications via a mobile computing device operating system. Memory 845 can be utilized for storing a device operating system, device programming, one or more stored applications, for example, mobile telephone applications, data processing applications, calculators, games, Internet browsing applications, navigation applications, acceleration applications, camera and/or video applications, client applications etc.

Mobile computing device 800 can contain an accelerometer 855 for detecting acceleration, and can be used to sense orientation, vibration, and/or shock. Mobile computing device 800 can contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the mobile computing device 800 to communicate with other communication devices and systems via one or more wireless networks (e.g., cellular, Wi-Fi, Bluetooth, etc.). Radio functions 850 can be utilized to communicate with a wireless or WI-FI-based positioning system to determine a device location.

Figure 9:
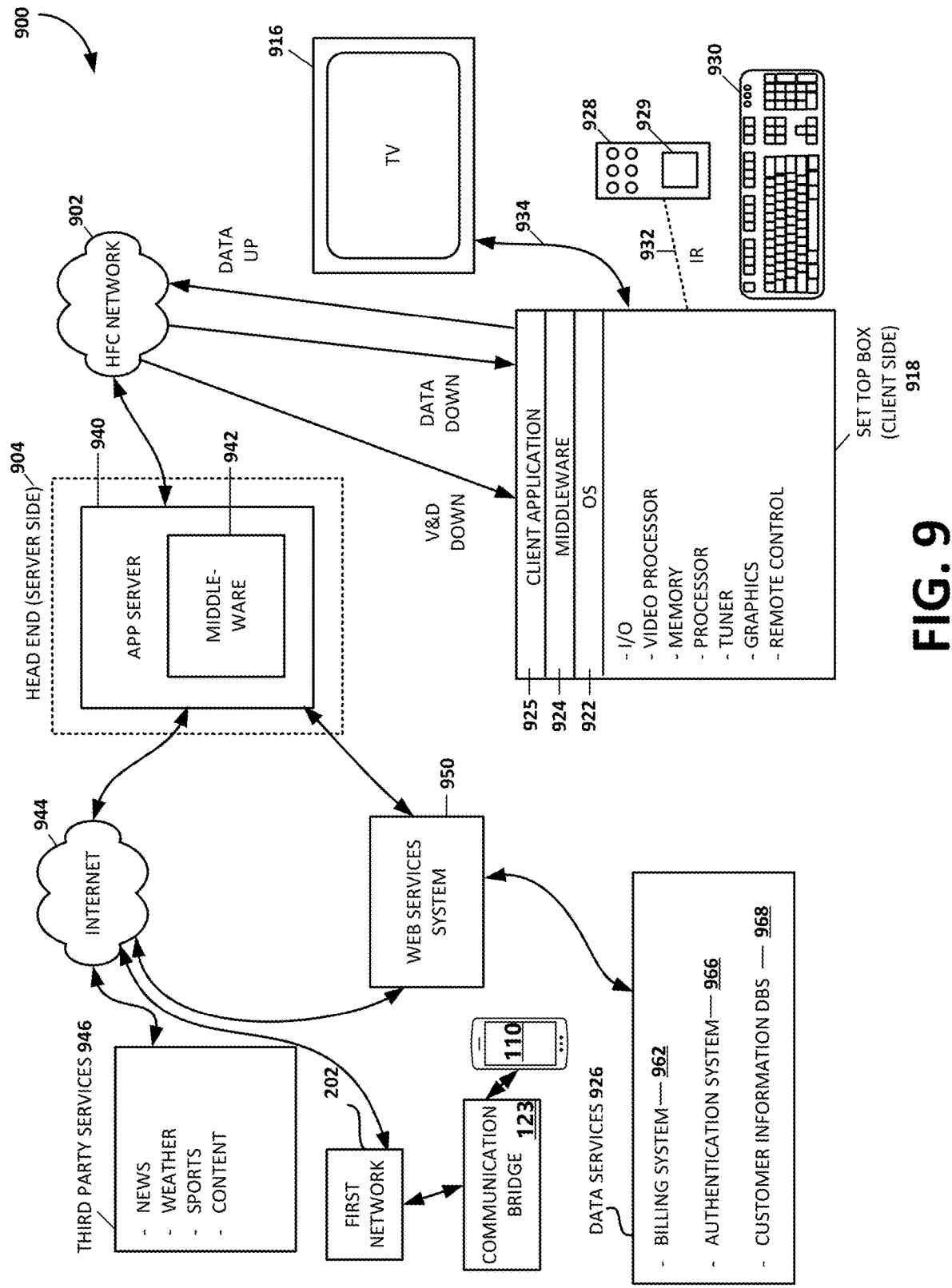
FIG. 9 is a block diagram illustrating components of a cable services system architecture providing an example operating environment according to aspects of the present disclosure.

FIG. 9 is a block diagram illustrating a cable television services system 900 (hereafter referred to as "CATV") architecture providing an operating environment according to an aspect. As should be appreciated, a CATV services system 900 is but one of various types of systems that can be utilized for providing an operating environment in which digital receiver integrated local channel insertion may be provided using one or more aspects described herein. Referring now to FIG. 9, digital and analog video programming, information content and interactive television services are provided via a HFC network 902 to a television set 916 for consumption by a cable television/services system customer. As is known to those skilled in the art, HFC networks 902 combine both fiber optic cable lines and coaxial cable lines. Typically, fiber optic cable lines run from the cable head end 920 to neighborhoods of subscribers. Coaxial cable lines run from the optical fiber feeders to each customer or subscriber.

The CATV system 900 is in the form of a distributed client-server computing system for providing video and data flow across the HFC network 902 between server-side services providers (e.g., cable television/services providers) via a server-side head end 920 and a client-side customer via a set-top box (STB) 918 functionally connected to a customer receiving device, such as the television set 916. The functionality of the HFC network 902 allows for efficient bidirectional data flow between the set-top box 918 and an application server 940 of the server-side head end 920. As is understood by those skilled in the art, modern CATV systems 900 can provide a variety of services across the HFC network 902 including traditional digital and analog video programming, telephone services, high speed Internet access, video-on-demand, and services.

On the client side of the CATV system 900, digital and analog video programming and digital and analog data are provided to the customer television set 916 via the STB 918. In some examples, a digital receiver may be embodied as the STB 918. Interactive television services that allow a customer to input data to the CATV system 900 likewise are provided by the STB 918. As illustrated in FIG. 9, the STB 918 is a multipurpose computing device having a computer processor, memory, and an input/output mechanism. The input/output mechanism receives input from server-side processes via the HFC network 902 and from customers via input devices such as a remote control device 928, keyboard 930, or other computing device, such as a tablet/slate computer, smart phone, etc. The remote control device 928 and the keyboard 930 can communicate with the STB 918 via a suitable communication transport such as the infrared connection 932. The STB 918 also includes a video processor for processing and providing digital and analog video signaling to the television set 916 via a cable communication transport 934. A multi-channel tuner is provided for processing video and data to and from the STB 918 and the server-side head end 920 (or 106), described below.

The STB 918 also includes an operating system 922 for directing the functions of the STB 918 in conjunction with a variety of client applications 925. For example, if a client application 925 requires a news flash from a third party news source to be displayed on the television 916, the operating system 922 can cause the graphics functionality and video processor of the STB 918, for example, to output the news flash to the television 916 at the direction of the client application 925 responsible for displaying news items.

Because a variety of different operating systems 922 can be utilized by a variety of different brands and types of set-top boxes 918, a middleware layer 924 can be provided to allow a given software application to be executed by a variety of different operating systems. According to an embodiment, the middleware layer 924 can include a set of application programming interfaces (APIs) that are exposed to client applications and operating systems 922 that allow client applications 925 to communicate with the operating systems 922 through common data calls understood via the API set. As described below, a corresponding middleware layer 942 is included on the server side of the CATV system 900 for facilitating communication between the server-side application server and the client-side STB 918. The middleware layer 942 of the server-side application server and the middleware layer 924 of the client-side STB 918 can format data passed between the client side and server side according to the Extensible Markup Language (XML).

According to one aspect, the STB 918 passes digital and analog video and data signaling to the television 916 via a one-way communication transport 934. According to other aspects, two-way communication transports can be utilized, for example, via high definition multimedia (HDMI) ports. The STB 918 can receive video and data from the server side of the CATV system 900 via the HFC network 902 through a video/data downlink and data via a data downlink. The STB 918 can transmit data from the client side of the CATV system 900 to the server side of the CATV system 900 via the HFC network 902 via one data uplink. The video/data downlink is an "in band" downlink that allows for digital and analog video and data signaling from the server side of the CATV system 900 through the HFC network 902 to the STB 918 for use by the STB 918 and for distribution to the television set 916. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 9, between the HFC network 902 and the STB 918 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 918 and the server-side application server 940 is typically passed through the "out of band" data links. Alternatively, an "in band" data carousel can be positioned in an "in band" channel into which a data feed can be processed from the application server 940 through the HFC network 902 to the STB 918. Operation of data transport between components of the CATV system 900, described with reference to FIG. 9, is well known to those skilled in the art.

Referring still to FIG. 9, the head end 920 of the CATV system 900 is positioned on the server side of the CATV system and includes hardware and software systems responsible for originating and managing content for distributing through the HFC network 902 to client-side STBs 918 for presentation to customers. As described above, a number of services can be provided by the CATV system 900, including digital and analog video programming, interactive television services, telephone services, video-on-demand services, targeted advertising, internet services, and/or provision of supplemental content.

The application server 940 can be configured as a computing system operative to assemble and manage data sent to and received from the STB 918 via the HFC network 902 including data used as part of a failover service. As described above, the application server 940 includes a middleware layer 942 for processing and preparing data from the head end 920 of the CATV system 900 for receipt and use by the client-side STB 918. For example, the application server 940 via the middleware layer 942 can obtain supplemental content from third party services 946 via the Internet 944 for transmitting to a customer through the HFC network 902, the STB 918, and recording by a local or remote DVR. For example, content metadata from a third party content provider service can be downloaded by the application server 940 via the Internet 944. When the application server 940 receives the downloaded content metadata, the middleware layer 942 can be utilized to format the content metadata for receipt and use by the STB 918. Therefore, content metadata can be sent and categorized based on the availability to the customer's program guide data.

According to one embodiment, data obtained and managed by the middleware layer 942 of the application server 940 is formatted according to the Extensible Markup Language and is passed to the STB 918 through the HFC network 902 where the XML-formatted data can be utilized by a client application 925 in concert with the middleware layer 924, as described above. As should be appreciated by those skilled in the art, a variety of third party services data 946, including news data, weather data, sports data and other information content can be obtained by the application server 940 via distributed computing environments such as the Internet 944 for provision to customers via the HFC network 902 and the STB 918. Additionally, the application server 940 may receive data via the Internet 944.

According to aspects, the application server 940 obtains customer support services data, including billing data, information on customer work order status, answers to frequently asked questions, services provider contact information, and the like from data services 926 for provision to the customer via an interactive television session. The data services 926 include a number of services operated by the services provider of the CATV system 900 which can include profile and other data associated with a given customer.

A billing system 962 can include information such as a customer's name, street address, business identification number, Social Security number, credit history, and information regarding services and products subscribed to by the customer. According to embodiments, the billing system 962 can also include billing data for services and products subscribed to by the customer for bill processing, billing presentment and payment receipt. An authentication system 966 can include information such as secure user names, subscriber profiles, subscriber IDs, and passwords utilized by customers for access to network services. A customer information database 968 can include general information about customers such as place of employment, business address, business telephone number, and demographic information such as age, gender, educational level, and the like. The customer information database 968 can also include information on pending work orders for services or products ordered by the customer. The customer information database 968 can also include general customer information such as answers to frequently asked customer questions and contact information for various service provider offices/departments. As should be understood, this information can be stored in a variety of disparate databases operated by the cable services provider.

Referring still to FIG. 9, web services system 950 is illustrated between the application server 940 and the data services 926. According to aspects, web services system 950 serves as a collection point for data requested from each of the disparate data services systems comprising the data services 926. According to aspects, when the application server 940 requires customer services data from one or more of the data services 926, the application server 940 passes a data query to the web services system 950. The web services system 950 formulates a data query to each of the available data services systems for obtaining any required data for a requesting customer as identified by a set-top box identification associated with the customer. The web services system 950 serves as an abstraction layer between the various data services systems and the application server 940. That is, the application server 940 is not required to communicate with the disparate data services systems, nor is the application server 940 required to understand the data structures or data types utilized by the disparate data services systems. The web services system 950 is operative to communicate with each of the disparate data services systems for obtaining necessary customer data. The customer data obtained by the web services system is assembled and is returned to the application server 940 for ultimate processing via the middleware layer 942, as described above. As should be understood by those skilled in the art, the disparate systems 950, 962, 966, 968 can be integrated or provided in any combination of separate systems, wherein FIG. 9 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system comprising:
a smartphone having at least one cellular network interface wirelessly coupled to a cellular network and at least one non-cellular network interface, wherein the smartphone is operable to transform cellular data signals received by the cellular signal interface to non-cellular data signals for communicating via the non-cellular signal interface;
customer premise equipment (CPE) for providing data services of an internet service provider (ISP) to a plurality of devices, the CPE including:
a modem for receiving non-cellular data signals from the ISP;
a router connected to the modem and forming a first network to which one or more of the plurality of devices are connected, the router receiving, from the modem, the non-cellular data signals for provision to the one or more of the plurality of devices over the first network; and
a communication bridge wirelessly coupled to the non-cellular signal interface of the smartphone and coupled to the router;
wherein the router is operable to:
in response to at least one of a loss or an interruption of the non-cellular data signals received from the ISP, the modem malfunctioning, an internet speed falling below a threshold, or a signal quality issue, use the smartphone as an internet connection source instead of the modem;
wherein the communication bridge is operable to establish a communication path between the smartphone and the router such that non-cellular data signals communicated via the smartphone are conveyed across the communication bridge to the router for provision to the one or more of the plurality of devices over the first network;
wherein a subset of the plurality of devices is determined by a machine learning component on a server to receive the non-cellular data signals over the first network from the router when the smartphone is activated as the internet connection source; and
wherein in response to determining that the bandwidth of the cellular network is below a threshold bandwidth, one or more devices from the subset of the plurality of devices are identified using the machine learning component for the router to discontinue provision of the non-cellular data signals over the first network.

2. The system of claim 1, wherein the router includes a network port to connect the router to the communication bridge via a cable to form an ethernet wide area network connection.

3. The system of claim 2, wherein the router comprises one or more access points for wirelessly transmitting the data signals to the one or more of the plurality of devices.

4. The system of claim 1, wherein the modem, the router, and the communication bridge are integrated in a gateway device.

5. The system of claim 1, wherein the communication bridge is a multi-band Wi-Fi device having a plurality of radios, where a first radio is configured as a Wi-Fi client.

6. The system of claim 1, wherein the server is associated with the ISP, the server comprising:
at least one processor; and
a memory storage device storing instructions, including instructions for executing the machine learning component to determine the subset of the plurality of the devices to receive the non-cellular data signals over the first network from the router when the smartphone is activated as the internet connection source.

7. The system of claim 6, wherein to determine the subset of the plurality of the devices to receive the cellular signals over the first network from the router, the instructions when executed by the at least one processor, further cause the server to:
receive information about operational and/or configuration parameters of one or more of the smartphone, the router, and the plurality of devices; and
based on the received information, automatically determine the subset of the plurality of the devices to receive the non-cellular data signals over the first network from the router.

8. The system of claim 7, wherein the machine learning component quantifies at least one of:
most frequently used device types;
most frequently used application types;
locations within a premise of the plurality of the devices;
a distance from the locations to the router; and
an ability of one or more of the plurality of the devices to connect in a deadspot.

9. The system of claim 6, wherein the determination of the subset of the plurality of the devices is further based on a priority associated with the plurality of devices, wherein the priority of each of the plurality of devices is one or more of: specified by a customer, included as one or more business rules provided by the ISP, and automatically learned by the machine learning component.

10. The system of claim 9, wherein the priority associated with the plurality of devices is based on a type of services provided by the devices.

11. The system of claim 6, the instructions when executed by the at least one processor further cause the server to transmit a notification to an application associated with the ISP that is accessible on at least the smartphone, the notification prompting a customer to position one or more devices within the subset of the devices closer to the router.

12. The system of claim 6, wherein to determine the subset of the plurality of the devices to receive the non-cellular signals over the first network from the router, the instructions when executed by the at least one processor further cause the server to:
 receive, from an application associated with the ISP, a selection of one or more of the plurality of devices to failover when the smartphone is the internet connection source; and
 store the selected one or more of the plurality of devices as the subset at the server.

13. The system of claim 1, wherein the communication bridge is operable to:
 automatically pair with the smartphone;
 receive a selection to pair with the smartphone from a failover application; and
 receive instructions from the router to initiate the pairing.

14. The system of claim 13, wherein the router is further operable to:
 in response to detecting a resumption in the non-cellular data signals received from the ISP via the modem, disable use of the smartphone as the internet connection source.

15. A method for providing failover mode to a cellular network, the method comprising:
 coupling a communication bridge with a smartphone and a router that forms a first network to which a plurality of devices are connected for accessing the internet using data services of an internet service provider (ISP) with the smartphone connected to a cellular network;
 in response to detecting a disruption associated with the data services of the ISP, failover to the cellular network, the failover comprising:
 prompting activation of a hotspot of the smartphone, the activation causing the smartphone to form a second network for providing access to the internet via the cellular network;
 using the communication bridge to form a communication channel between the smartphone and the router;
 using the smartphone to translate cellular data signals received via the cellular network into non-cellular data signals; and
 communicating the non-cellular data signals from the smartphone across the communication bridge to the router for provision to at least a subset of the plurality of devices over the first network, wherein the subset of the plurality of devices is determined by a machine learning component on a server to receive the non-cellular data signals over the first network from the router when the smartphone is activated as the internet connection source, and wherein in response to determining that the bandwidth of the cellular network is below a threshold bandwidth, one or more devices from the subset of the plurality of devices are identified using the machine learning component for the router to discontinue provision of the non-cellular data signals over the first network; and
 in response to detecting a resumption of the data services of the ISP, initiating a disablement of the communication bridge.

16. The method of claim 15, wherein the modem, the router, and the communication bridge are integrated in a gateway device.

17. A non-transitory computer readable media that includes executable instructions which, when executed provide a failover mode by:
 receiving data services of an internet service provider (ISP) over a first network;
 in response to detecting a disruption associated with the data services of the ISP, failover to the cellular network, the failover comprising:
 prompting activation of a hotspot of the smartphone, the activation causing the smartphone to form a second network for providing access to the internet via the cellular network;
 using a communication bridge to form a communication channel between the smartphone and a router;
 using the smartphone to translate cellular data signals received via the cellular network into non-cellular data signals; and
 communicating the non-cellular data signals from the smartphone across the communication bridge to the router for provision to at least a subset of the plurality of devices over the first network, wherein the subset of the plurality of devices is determined by a machine learning component on a server to receive the non-cellular data signals over the first network from the router when the smartphone is activated as the internet connection source, and wherein in response to the determining that the bandwidth of the cellular network is below a threshold bandwidth, one or more devices from the subset of the plurality of devices are identified using the machine learning component for the router to discontinue provision of the non-cellular data signals over the first network; and
 in response to detecting a resumption of the data services of the ISP, initiating a disablement of the communication bridge.

18. The non-transitory computer readable media of claim 17, wherein the router includes a network port to connect the router to the communication bridge via a cable to form an ethernet wide area network connection.

19. The non-transitory computer readable media of claim 18, wherein the router comprises one or more access points for wirelessly transmitting the data signals to the one or more of the plurality of devices.

* * * * *